Figure 1:
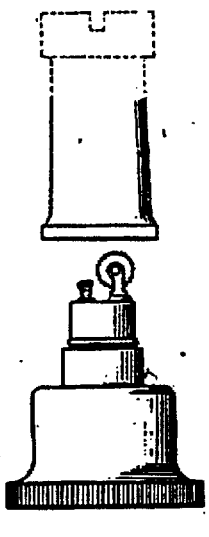

BEST AVAILABLE COPY

Oct. 9, 1945. H. NEGBAUR Des. Re. 22,679

CIGARETTE LIGHTER

Original Filed March 29, 1944

INVENTOR
HARRY NEGBAUR

BY John W. Cobb
ATTORNEY

BEST AVAILABLE COPY

Reissued Oct. 9, 1945

Des. Re. 22,679

UNITED STATES PATENT OFFICE 22,679

DESIGN FOR A CIGARETTE LIGHTER

Harry Negbaur, New York, N. Y.

Original No. 138,039, dated June 13, 1944, Serial No. 113,066, March 29, 1944, for 14 years. Application for reissue June 1, 1945, Serial No. 119,874

Term of patent 14 years (Cl. D48—27)

*To all whom it may concern:*

Be it known that I, Harry Negbaur, a citizen of the United States of America and a resident of New York, in the county of New York and State of New York, have invented a new, original, and ornamental Design for a Cigarette Lighter, of which the following is a specification, reference being had to the accompanying drawing, forming a part thereof.

Figure 2:
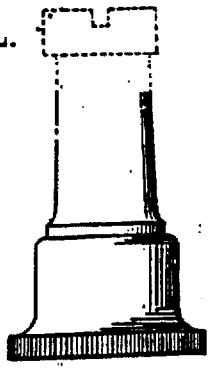

In the drawing:

Figure 1 is an illustration in side elevation of a cigarette lighter, showing my new design, with the base and cap or cover member separated; and Figure 2 is an elevational view of the same, the cap and base being assembled.

The essential features of my design reside in the portions indicated in the drawing in full lines.

I claim:

The ornamental design for a cigarette lighter, as shown and described.

HARRY NEGBAUR.